United States Patent
Apshankar et al.

(10) Patent No.: US 10,410,152 B2
(45) Date of Patent: Sep. 10, 2019

(54) SYSTEM AND METHOD FOR AUTOMATICALLY AND EFFICIENTLY MONITORING SOFTWARE DEVELOPMENT LIFE CYCLES

(71) Applicant: Cognizant Technology Solutions India Pvt. Ltd., Chennai (IN)

(72) Inventors: Kapil Apshankar, Pune (IN); Rajkumar Chandrasekaran, Chennai (IN); Vishal Ganjare, Nagpur (IN); Mayank Gangwal, Pune (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 198 days.

(21) Appl. No.: 15/396,343

(22) Filed: Dec. 30, 2016

(65) Prior Publication Data

US 2018/0082233 A1 Mar. 22, 2018

(30) Foreign Application Priority Data

Sep. 21, 2016 (IN) .............................. 201641032260

(51) Int. Cl.
*G06Q 10/06* (2012.01)
*G06F 11/30* (2006.01)
*G06F 11/32* (2006.01)
*G06F 11/34* (2006.01)
*G06F 11/36* (2006.01)

(52) U.S. Cl.
CPC ..... *G06Q 10/06313* (2013.01); *G06F 11/302* (2013.01); *G06F 11/328* (2013.01); *G06F 11/3495* (2013.01); *G06F 11/3068* (2013.01); *G06F 11/3604* (2013.01)

(58) Field of Classification Search
CPC . G06Q 11/302; G06F 11/328; G06F 11/3495; G06F 11/3616; G06F 11/3668
USPC ........................................................ 717/101
See application file for complete search history.

(56) References Cited

U.S. PATENT DOCUMENTS

| | | |
|---|---|---|
| 2005/0210442 A1 | 9/2005 | Seetharaman |
| 2012/0005055 A1 | 1/2012 | Luke |
| 2013/0152047 A1* | 6/2013 | Moorthi ............... G06F 11/368 717/124 |

(Continued)

*Primary Examiner* — Emerson C Puente
*Assistant Examiner* — Sen Thong Chen
(74) *Attorney, Agent, or Firm* — Cantor Colburn LLP (57) ABSTRACT

A system, computer-implemented method and computer program product for monitoring one or more software development life cycles is provided. The system comprises one or more agents configured to collect data pertaining to one or more Software Development Life Cycles (SDLCs) from one or more tools. The system further comprises a data aggregator and co-relator configured to convert the collected data to one or more object formats and co-relate the converted data by storing the converted data in a graph database as one or more nodes and corresponding relationships and properties, wherein each of the one or more nodes comprise converted data corresponding to a specific tool. Furthermore, the system comprises an indexed database configured to index the stored data. In addition, the system comprises a dashboard viewer configured to render the indexed data on one or more pre-configured dashboards for one or more users.

15 Claims, 7 Drawing Sheets

(56) References Cited

U.S. PATENT DOCUMENTS

2013/0204886 A1\* 8/2013 Faith ................. G06Q 30/0631
                                                           707/756
2016/0274995 A1\* 9/2016 Klein ................. G06F 11/3608
2017/0023919 A1\* 1/2017 Breyfogle .......... G05B 23/0232

\* cited by examiner

FIG. 1

| | |
|---|---|
| git_RepoName | DemoApp |
| git_ScmRevisionNumber | 2cf414af28949544a2ef4471c746a4dc555076fe |
| git_ScmCommitTimestamp | 2016-03-13T13:52:08Z |
| uuid | 8496e9fc-0d01-11e6-bec5-005056b154ec |
| git_ScmAuthor | mayankdevops |

FIG. 1A

| | |
|---|---|
| jen_StartedBy | Started by an SCM change |
| jen_buildDuration | 177066 |
| jen_Result | SUCCESS |
| jen_RundeckJobId | (empty) |
| jen_SCMRemoteUrl | https://github.com/mayankdevops/DemoMavenApp.git |
| jen_FormattedDateStart | 2016-04-25T21:42:45Z |
| jen_SonarUrl | http://localhost:9000/sonar/dashboard/index/com.cts.devops:demomavenapp |
| uuid | 890feef0-0d01-11e6-bec5-005056b154ec |
| jen_FormattedDateEnd | 2016-04-25T21:45:42Z |
| jen_SCMAuthor | mayank.devops |
| jen_GroupId | com.cts.devops |
| jen_SCMCommitId | 5438c708f8fabac3fc3b4c2a7fe235eea9bbe328 |
| jen_SCMKind | Git |
| jen_BuildNumber | 6 |
| jen_TimeStampEnd | 1461600942606 |
| jen_ArtifactId | Demomavenapp |
| jen_NexusRepo | http://localhost:9005/nexus/content/repositories/Platform-SNAPSHOT |
| jen_TimeStamp | 1461600765540 |
| jen_JobName | DemoMavenApp |

FIG. 1B

| | |
|---|---|
| son_new_coverage | *(empty)* |
| son_FormattedDate | 2016-04-25T21:45:26Z |
| son_coverage | *(empty)* |
| son_duplicated_blocks | 54 |
| son_duplicated_files | 20 |
| uuid | 89845ba1-0d01-11e6-bec5-005056b154ec |
| son_UnixTimestamp | 1461600926000 |
| son_complexity | 187 |
| son_Date | 2016-04-25T21:45:26+0530 |
| son_sqale_debt_ratio | 11.5 |
| son_sqale_index | 8524 |
| son_Resourcekey | com.cts.devops.demomavenapp |
| son_new_violations | *(empty)* |

FIG. 1C

| Field | Value |
|---|---|
| run_DateEnded | 1461600799067 |
| run_DateStarted | 1461600797484 |
| run_SuccessNodes | CTSC00607758201 |
| run_FormattedDateStart | 2016-04-25T21:43:17Z |
| run_ExecutionId | 151 |
| run_FormattedDateEnd | 2016-04-25T21:43:19Z |
| uuid | 8a975242-0d01-11e6-bec5-005056b154ec |
| run_FailNodes | (empty) |
| run_JobName | DemoAppWarDeploy |
| run_JobId | 9bffbe17-05e1-4138-9882-b1e0ada87f04 |
| run_Status | succeeded |
| run_PermaLink | http://CTSC00607758201:4440/project/OnlineBanking/execution/show/151 |
| run_ProjectName | OnlineBanking |

SYSTEM AND METHOD FOR AUTOMATICALLY AND EFFICIENTLY MONITORING SOFTWARE DEVELOPMENT LIFE CYCLES

FIELD OF THE INVENTION

The present invention relates generally to monitoring Software Development Life Cycles (SDLC). More particularly, the present invention provides a system and method for automatically and efficiently monitoring the SDLCs.

BACKGROUND OF THE INVENTION

With the advancement and widespread use of technology, enterprises demand accelerated software delivery so that end products reach customers quickly. In order to achieve this, enterprises need to efficiently manage Software Development Life Cycles (SDLC) of their products.

Conventionally, enterprises employ various systems and methods for monitoring SDLCs of their products. For example, the enterprises manually obtain information regarding the development of the software from various teams involved in the SDLCs and communicate the same to stakeholders. However, manually obtaining and communicating the information regarding the SDLCs to the stakeholders is cumbersome and prone to errors. To overcome the above mentioned disadvantages, the enterprises have begun to adopt Development and Operations (DevOps) model of delivery. The DevOps model of delivery aims at improving communication and collaboration between software development teams and operations team of the enterprises. However, the DevOps model of delivery also suffers from several disadvantages. For instance, in order to adopt DevOps model of delivery the development teams need to know the bottlenecks and issues in the SDLC to take corrective measures.

In light of the abovementioned disadvantages, there is a need for a system and method for automatically and efficiently monitoring one or more SDLCs. Further, there is a need for a system and method that interfaces with one or more tools involved in the development of software, provides detailed insight into the entire SDLC and generates reports thereof. Furthermore, there is a need for a system and method that is capable of flagging any issues with the one or more SDLCs. In addition, there is a need for a system and method that is capable of determining additional time and cost associated with software releases due to bottlenecks and delay in the SDLC. Also, there is a need for a system and method that is capable of measuring the maturity level of the SDLC and facilitates taking corrective actions.

SUMMARY OF THE INVENTION

A system, computer-implemented method and computer program product for monitoring one or more software development life cycles is provided. The system comprises one or more agents configured to collect data pertaining to one or more Software Development Life Cycles (SDLCs) from one or more tools. The system further comprises a data aggregator and co-relator configured to convert the collected data to one or more object formats and co-relate the converted data by storing the converted data in a graph database as one or more nodes and corresponding relationships and properties, wherein each of the one or more nodes comprise converted data corresponding to a specific tool. Furthermore, the system comprises an indexed database configured to index the stored data. In addition, the system comprises a dashboard viewer configured to render the indexed data on one or more pre-configured dashboards for one or more users.

In an embodiment of the present invention, the one or more tools comprise Source Control Management (SCM) tools, Continuous Integration (CI) tools, code review tools, static code analysis tools, release planning tools, artifact repositories, package repositories, Information Technology Service Management (ITSM) tools, deployment automation tools, infrastructure provisioning tools, database versioning tools, configuration automation tools and release monitoring tools.

In an embodiment of the present invention, the data is collected by the one or more agents using Representational State Transfer (REST) Application Program Interface (API). In an embodiment of the present invention, the one or more object formats comprise Java Script Object Notation (JSON) format.

In an embodiment of the present invention, the system further comprising a query builder configured to provide options to facilitate the one or more users to create one or more customized dashboards, wherein the one or more customized dashboards are created by customizing the one or more pre-configured dashboards based on user preferences.

The computer-implemented method for monitoring one or more software development life cycles, via program instructions stored in a memory and executed by a processor, comprises collecting data pertaining to one or more Software Development Life Cycles (SDLCs) from one or more tools. The computer-implemented method further comprises converting the collected data to one or more object formats. Furthermore, the computer-implemented method comprises co-relating the converted data by storing the converted data in a graph database as one or more nodes and corresponding relationships and properties, wherein each of the one or more nodes comprise converted data corresponding to a specific tool. In addition, the computer-implemented method comprises indexing the stored data. Also, the computer-implemented method comprises rendering the indexed data on one or more pre-configured dashboards for one or more users.

The computer program product for monitoring one or more software development life cycles comprising a non-transitory computer-readable medium having computer-readable program code stored thereon, the computer-readable program code comprising instructions that when executed by a processor, cause the processor to collect data pertaining to one or more Software Development Life Cycles (SDLCs) from one or more tools. The processor further converts the collected data to one or more object formats. Furthermore, the processor co-relates the converted data by storing the converted data in a graph database as one or more nodes and corresponding relationships and properties, wherein each of the one or more nodes comprise converted data corresponding to a specific tool. In addition, the processor indexes the stored data. Also, the processor renders the indexed data on one or more pre-configured dashboards for one or more users.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for automatically and efficiently monitoring one or more Software Development Life Cycles (SDLCs) is described herein. The invention provides for a system and method that interfaces with one or more tools involved in the development of software, provides detailed insight into the entire SDLC and generates reports thereof. Further, the invention provides for a system and method that is capable of flagging any issues with the one or more SDLCs. Furthermore, the invention provides for a system and method that is capable of determining additional time and cost associated with software releases due to bottlenecks and delay in the SDLC. The invention also provides for a system and method that is capable of measuring the maturity level of the SDLC and facilitates taking corrective actions.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
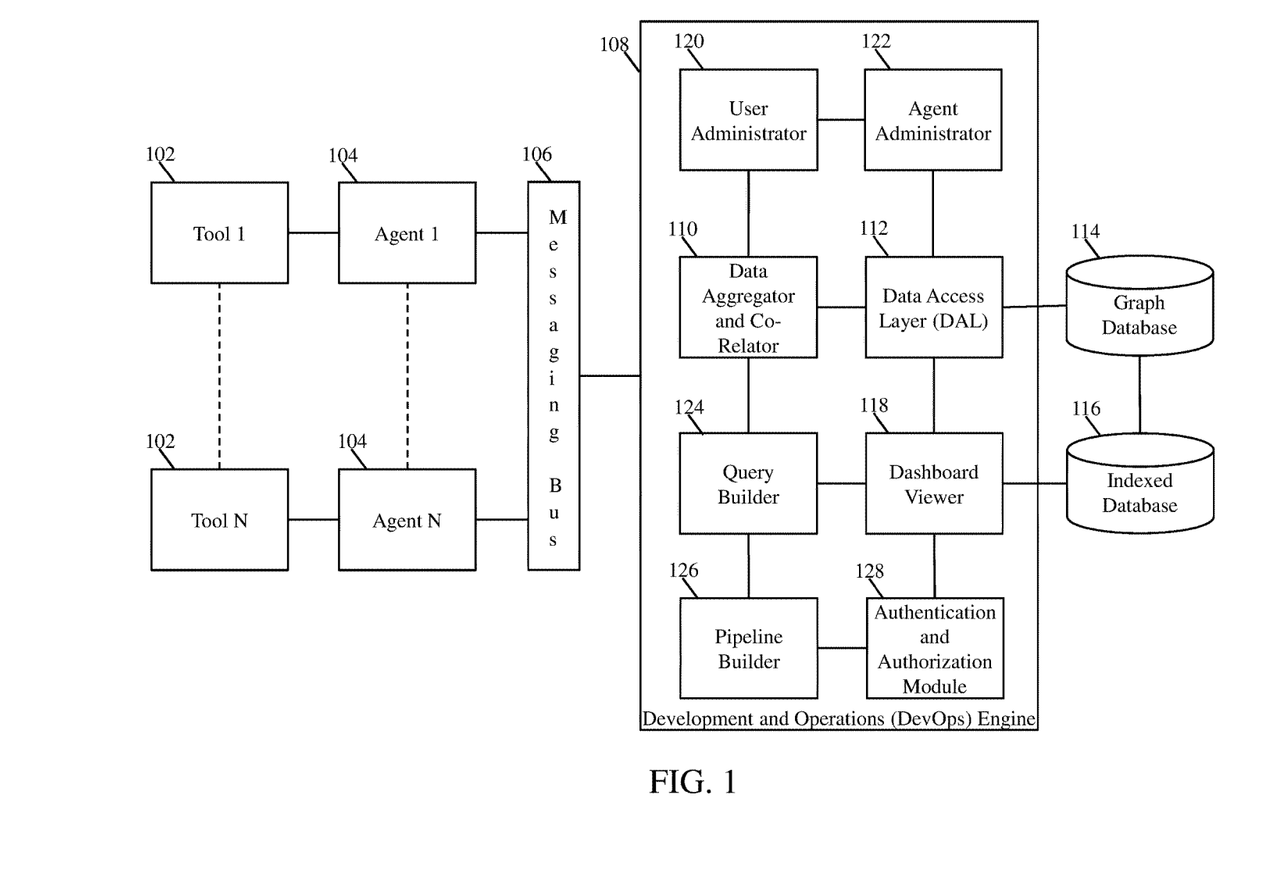
FIG. 1 is a block diagram illustrating a system for automatically and efficiently monitoring one or more Software Development Life Cycles (SDLCs), in accordance with an embodiment of the present invention.

FIG. 1 is a block diagram illustrating a system 100 for automatically and efficiently monitoring one or more SDLCs, in accordance with an embodiment of the present invention. The system 100 comprises one or more tools 102, one or more agents 104, a messaging bus 106, a Development and Operations (DevOps) engine 108, a graph database 114 and an indexed database 116. Further, the DevOps engine 108 comprises a data aggregator and co-relator 110, a Data Access Layer 112, a dashboard viewer 118, a user administrator 120, an agent administrator 122, a query builder 124, a pipeline builder 126 and an authentication and authorization module 128.

The one or more tools 102 are employed by one or more enterprises for developing software products. Further, each tool 102 has specific functionalities and interacts with other tools 102 during Software Development Life cycle (SDLC) of the software product. In an embodiment of the present invention, the one or more tools 102 include, but not limited to, Source Control Management (SCM) tools, Continuous Integration (CI) tools, code review tools, static code analysis tools, release planning tools, artifact repositories, package repositories, Information Technology Service Management (ITSM) tools, deployment automation tools, infrastructure provisioning tools, database versioning tools, configuration automation tools and release monitoring tools. Further, each SDLC requires a specific set of tools for development of the software product. Furthermore, the one or more tools 102 provide data pertaining to one or more SDLCs to the one or more agents 104. The data pertaining to the one or more SDLCs provided by the one or more tools 102 include, but not limited to, details on how and when the tools 102 were part of the one or more SDLCs.

The one or more agents 104 are configured to collect data pertaining to the one or more SDLCs and corresponding metadata from the one or more tools 102. Further, the one or more agents are deployed at a host system where the one or more tools 102 are deployed in order to minimize traffic during transmission, avoid latency in transmitting the information and mitigate security concerns arising during data transmission. In an embodiment of the present invention, the one or more agents 104 collect data from the one or more tools using Representational State Transfer (REST) Application Program Interface (API). In an exemplary embodiment of the present invention, the one or more agents 104 are light-weight software systems written in a programming language such as, but not limited to, python. Further, the one or more agents 104 run as daemons in the host system, share host system's resources and have negligible effect on the host system compute power and memory. Furthermore, each agent 104 has a unique identification which is used to send the data collected by the agent 104 and status of the corresponding agent 104 to the DevOps engine 108 via the messaging bus 106.

The messaging bus 106 is configured to facilitate communication between the one or more agents and the data aggregator and co-relator 110 residing in the DevOps engine 108. In an embodiment of the present invention, the one or more agents 104 serve as publishers and the data aggregator and co-relator 110 acts as a consumer. The one or more agents 104 use the REST API and pre-configured credentials to call the one or more tools 102 of the host system. The data from the one or more tools 102 along with the corresponding metadata is then placed in the message queue of the messaging bus 106 in a suitable format. The data aggregator and co-relator 110 uses the placed data and corresponding metadata for further processing. In another embodiment of the present invention, the one or more agents place the collected data in the message queue at pre-configured intervals. Further, the data aggregator and co-relator 110 acts as a subscriber and consumes the data placed on the message queue. In yet another embodiment of the present invention, the one or more agents 104 act as consumers. The data aggregator and co-relator 110 seeks information and places a request in the messaging bus 106 for the corresponding agent 104. The corresponding agent 104 receives the placed request and communicates with the corresponding tool 102 for collecting the requested information. The corresponding agent 104 then acts as a publisher and forwards the collected information in a suitable format to the messaging queue of the messaging bus 106. The data aggregator and co-relator 110 then acts as a consumer and uses the forwarded information in the messaging queue for further processing. In an embodiment of the present invention, the one or more agents 104 are stateless as these act as messengers of data and do not save any data themselves. In an exemplary embodiment of the present invention, the messaging bus 106 is implemented using messaging products such as, but not limited to, Rabbit MQ.

The data aggregator and co-relator 110, residing in the DevOps engine 108, is configured to receive the collected data from the messaging bus 106 and convert the received data into one or more object formats. In an embodiment of the present invention, the data aggregator and co-relator 110 converts the received data into JavaScript Object Notation (JSON) format. Further, the converted data in the JSON format is then used for creating and storing one or more nodes in the graph database 114.

The data aggregator and co-relator 110 is further configured to establish correlation between the converted data in the form of the one or more nodes and corresponding relationships and properties. In an embodiment of the present invention, the converted data is stored in the graph database 114 as the one or more nodes and the corresponding relationship between the one or more nodes are stored as relationship structure of the graph database 114. The relationships may be stored in uni-directional or bi-directional format. Once a particular node is found, using the relationships corresponding to the particular node, the entire chain of SDLC may be built. In an embodiment of the present invention, the correlated data is stored in the graph database 114 via the DAL 112. In another embodiment of the present invention, the correlated data is further processed to generate meaningful insights and reports.

In an embodiment of the present invention, the data aggregator and co-relator 110 is configured to process the correlated data to recommend maturity level of the one or more SDLCs. The maturity level of the one or more SDLCs is measured using one or more factors such as, but not limited to, build, deploy, environment, verification, release and Key Performance Indicators (KPI) and engineering metrics measurement. The build factor facilitates in identifying information related to compilation and packaging of the software application under development. The deploy factor facilitates in identifying information related deployment and installation of the software application in various environments. The verification factor facilitates in identifying information related to measures for testing the application for consistency of both functional and non-functional aspects. The release factor facilitates in identifying information related to installation and deployment of the application in controlled environments such as, but not limited to, user acceptance and production. The KPIs and engineering metrics measurement factor facilitates in identifying information related to measuring of application's KPI and engineering metrics and areas requiring improvement. In an embodiment of the present invention, each of the one or more factors have different levels of maturity such as, but not limited to, embracing, adapting, established, measured and effective. In an embodiment of the present invention, the levels of maturity of the one or more factors facilitate in identifying the overall maturity level of the SDLC and making appropriate changes and corrections to move to a desired level based on business objectives of the enterprise.

The DAL 112 is configured to facilitate communication of various modules of the DevOps engine 108 with the graph database 114 using one or more REST services. Further, the one or more REST services for communication are established based on the programming language. In an exemplary embodiment of the present invention, the REST services used for communication are established using Java.

The graph database 114 is configured to store the converted and co-related data received from the data aggregator and co-relator 110 via the DAL 112. The converted and co-related data is stored in the graph database 114 along with the corresponding metadata and its relationship with the other data. In an embodiment of the present invention, the converted and co-related data is stored in a graph format for easy traversal and search. In an embodiment of the present invention, the data stored in the graph format comprises the one or more nodes, the one or more relationships between the one or more nodes and the properties of both the one or more nodes and their relationships. Further, the one or more nodes are the data collected from the one or more tools 102 and its properties. In an embodiment of the present invention, relationships between the one or more nodes may be one to one or one to many. Furthermore, properties of the one or more nodes and the one or more relationships comprise, but not limited to, the metadata corresponding to the one or more nodes and the one or more relationships. In an exemplary embodiment of the present invention, Cypher is used to query the graph database 114 and implement standard Create, Read, Update, Delete (CRUD) operations within the graph database 114. In an embodiment of the present invention, the number of graph database instances vary based on the number of tools and projects. In an embodiment of the present invention, the communication between the DevOps engine 108 and the graph database 114 is secured using industry standard encryption systems.

The indexed database 116 is configured to index the stored data. In an embodiment of the present invention, the indexed database selectively indexes specific sets of data stored in the graph database 114. Further, indexing specific sets of data from the graph database 114 facilitates in making the indexed data readily available for use to the one or more users. Furthermore, the indexed data is easily searchable and capable of providing meaningful insights to the one or more users. In an exemplary embodiment of the present invention, the indexed database 116 uses Elasticsearch for locating the one or more nodes.

The dashboard viewer 118 has one or more pre-configured dashboards and one or more customized dashboards that are rendered for the one or more users via one or more electronic devices (not shown) used to access the system 100. The dashboard viewer 118 is capable of accessing the graph database 114 and the indexed database 116 for fetching and rendering the data stored in these databases on the one or more pre-configured dashboards and the one or more custom dashboards. Further, the dashboard viewer 118 renders the fetched data on the one or more pre-configured dashboards based on pre-defined roles of the one or more users. In an embodiment of the present invention, the one or more pre-configured dashboards are rendered on user interfaces of the one or more electronic devices. In an embodiment of the present invention, the one or more electronic devices (not shown) used for accessing the system 100 include, but not limited to, laptops, desktops and handheld devices such as tablets and mobile phones.

The user administrator 120 is configured to facilitate one or more administrators to define the one or more roles for the one or more users in the system 100 and provide access to the data stored in the graph database 114 and the indexed database 116 based on the defined one or more roles. Further, the one or more administrators define types of dashboards that are accessible by the one or more users based on their pre-defined roles. In an embodiment of the present invention, the one or more roles defined by the one or more administrators include, but not limited to, engineer, project manager, release manager, C-Level executives and administrator.

The agent administrator 122 is configured to monitor the one or more agents 104 deployed in the host system with the one or more tools 102. Further, the one or more agents 104 report their status at pre-configured time intervals, using a specific message format, via the messaging bus 106 to the agent administrator 122. Furthermore, the agent administrator 122 provides one or more options to the one or more administrators to check the status of the one or more agents 104 and take suitable actions in case of any issues with the one or more agents 104. In addition, the agent administrator 122 provides plug and play capabilities by facilitating the one or more administrators to enable and disable the one or more agents 104. Also, the agent administrator 122 facilitates the one or more administrators to configure one or more agents 104 for introducing new tools to the system 100. In an embodiment of the present invention, the agent administrator 122 is a logically separate entity from the DevOps engine 108 and accessible to limited users in order to avoid unauthorized access.

The query builder 124 is configured to facilitate creating the one or more customized dashboards in real-time using the one or more pre-configured dashboards corresponding to each of the one or more pre-defined roles. The query builder also generates meaningful insights from the data stored in the graph database 114 and the indexed database 116 in real-time during the creation of the one or more customized dashboards. The query builder 124 provides options to the one or more users to create the one or more customized dashboard by customizing the one or more pre-configured dashboards based on user preferences. In an embodiment of the present invention, the one or more users select the one or more tools 102 that the one or more users want to follow. The one or more customized dashboards then provide the stored data pertaining to the one or more selected tools 102. The query builder 124 also provides options to the one or more users to filter and view the filtered data corresponding to the selected tools. In an embodiment of the present invention, the one or more users filter the data based on, but not limited to, time interval, tools, persons involved in the SDLC and SDLC projects.

The pipeline builder 126 facilitates the one or more administrators to select the one or more tools 102 and define the type of agent that is required for collecting the data from the one or more tools 102 prior to operation. Further, the pipeline builder 126 facilitates in configuring and supporting new tools 102. The pipeline builder 126 also ensures that the new tools 102 have REST API capabilities for connecting with the DevOps engine 108.

The authentication and authorization module 128 is configured to control access to the system 100 and the data accessible via the system 100. In an embodiment of the present invention, the authentication and authorization module 128 uses enterprise authentication modules such as, but not limited to, active directory, Openauth, Security Assertion Markup Language (SAML) and Lightweight Directory Access Protocol (LDAP). Further, the authentication and authorization module 128 provides access to the one or more dashboards based on the pre-defined role of the one or more users.

The following paragraph of the specification illustrates an exemplary embodiment when the system 100 is in operation. The one or more tools 102 used in the exemplary embodiment comprise, but not limited to, Git as an SCM tool, Jenkins as a CI tool, Sonar as a static code analysis tool and RunDeck as a deployment automation tool. Once the above-mentioned tools 102 are connected to the DevOps engine 108, the data is collected from these tools by their corresponding agents 104. The REST API analysis is performed to identify the data that is collected by the one or more agents 104 associated with the above mentioned tools 102. The collected data is then converted and co-related into the graph format by the data aggregator and co-relator 110 and stored in the graph database 114.

Figure 1A:
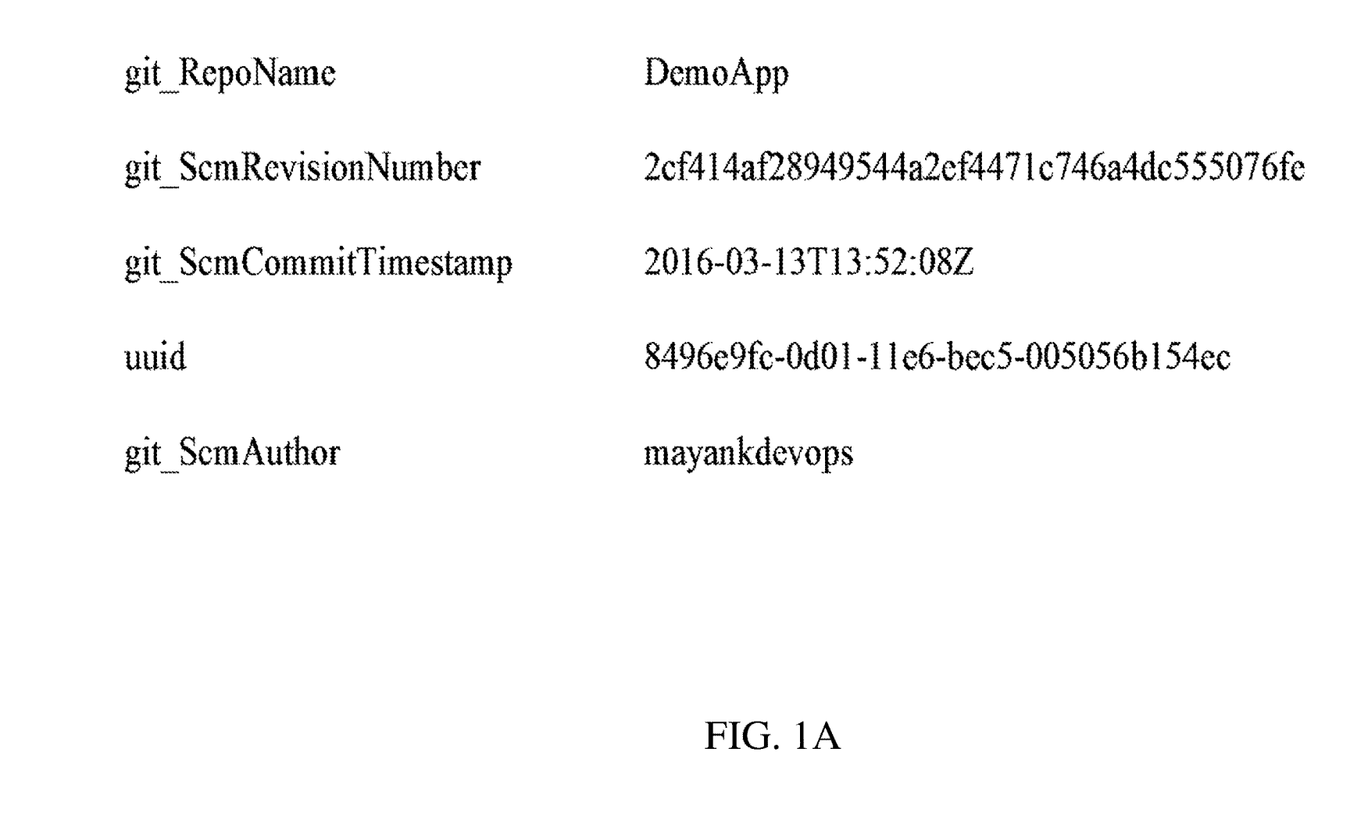
FIG. 1A is a table representing the data collected from the source control management tool Git, in accordance with an exemplary embodiment of the present invention.
Figure 1B:
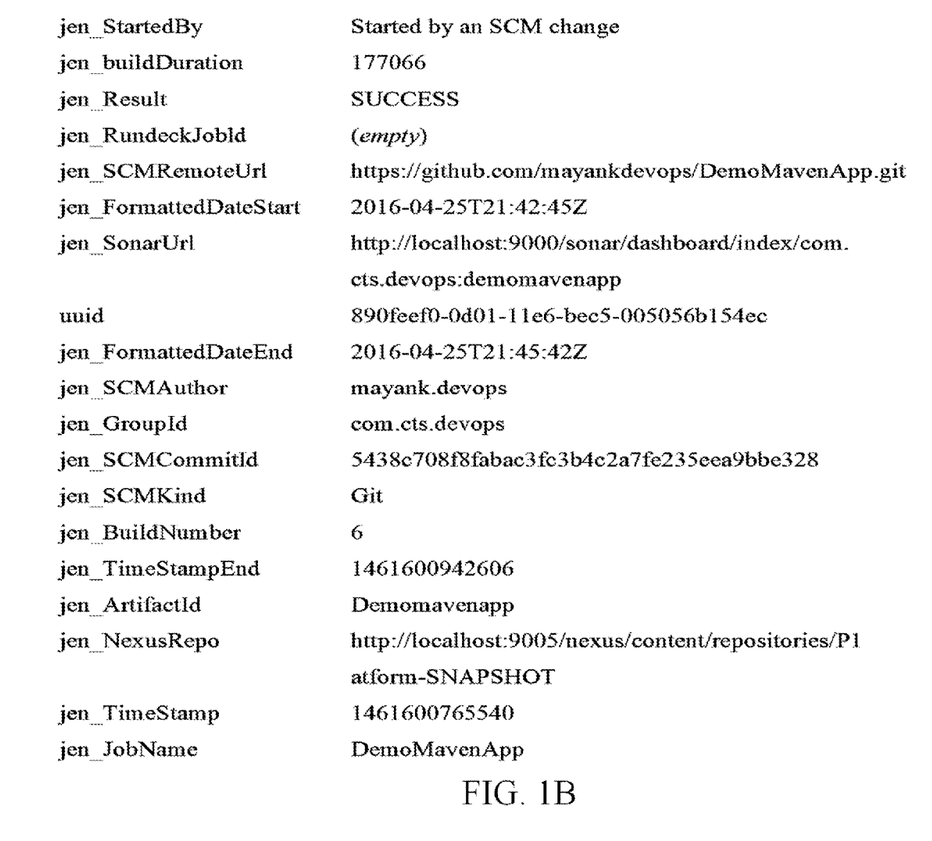
FIG. 1B is a table representing the data collected from the continuous integration tool Jenkins, in accordance with an exemplary embodiment of the present invention.

FIG. 1A is a table representing the data collected from the SCM tool Git, in accordance with an exemplary embodiment of the present invention. In an embodiment of the present invention, the data in the table provides code commit time stamp. FIG. 1B is a table representing the data collected from the CI tool Jenkins, in accordance with an exemplary embodiment of the present invention. The time elapsed from the code commit to the triggering of build is estimated from the data received from the Jenkins which comprises the timestamp of the build.

Figure 1C:
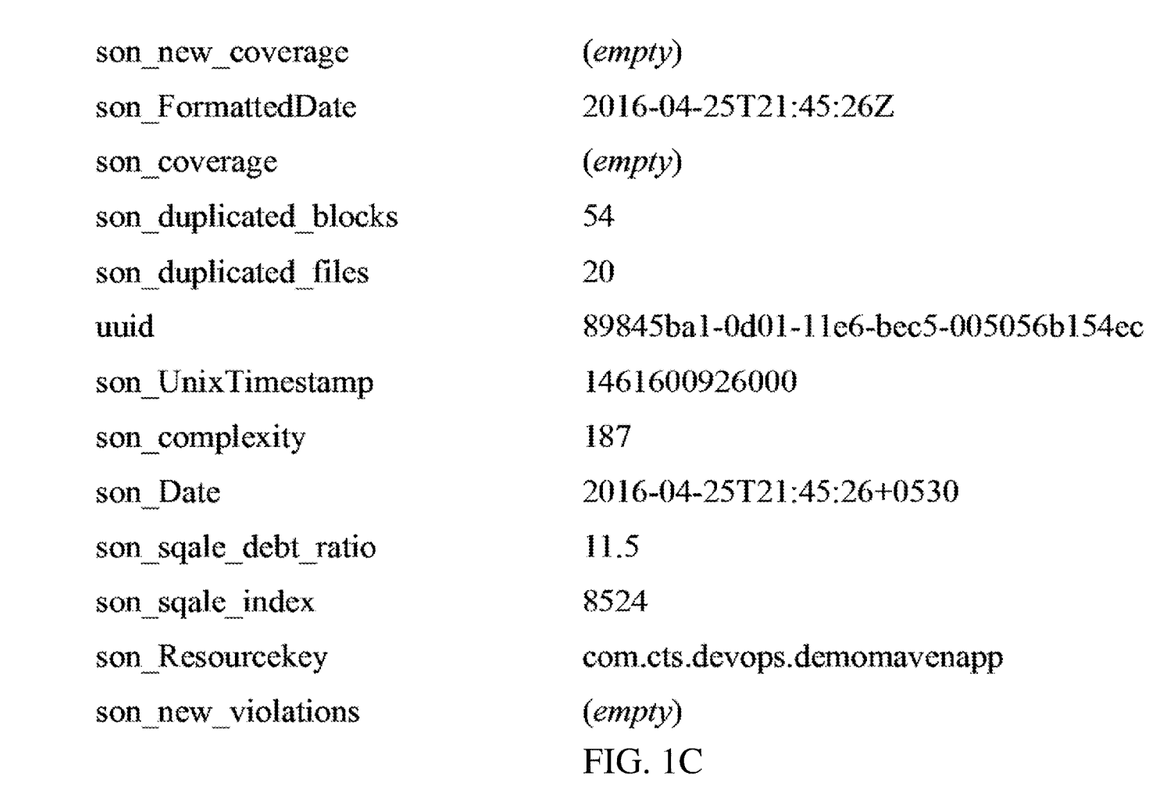
FIG. 1C is a table representing the data collected from the static code analysis tool Sonar, in accordance with an exemplary embodiment of the present invention.

FIG. 1C is a table representing the data collected from the static code analysis tool Sonar, in accordance with an exemplary embodiment of the present invention. The data from the Sonar facilitates in calculating the time taken for quality checks. Also, the data is used for ensuring that quality checks have been run on each and every build from Jenkins.

Figure 1D:
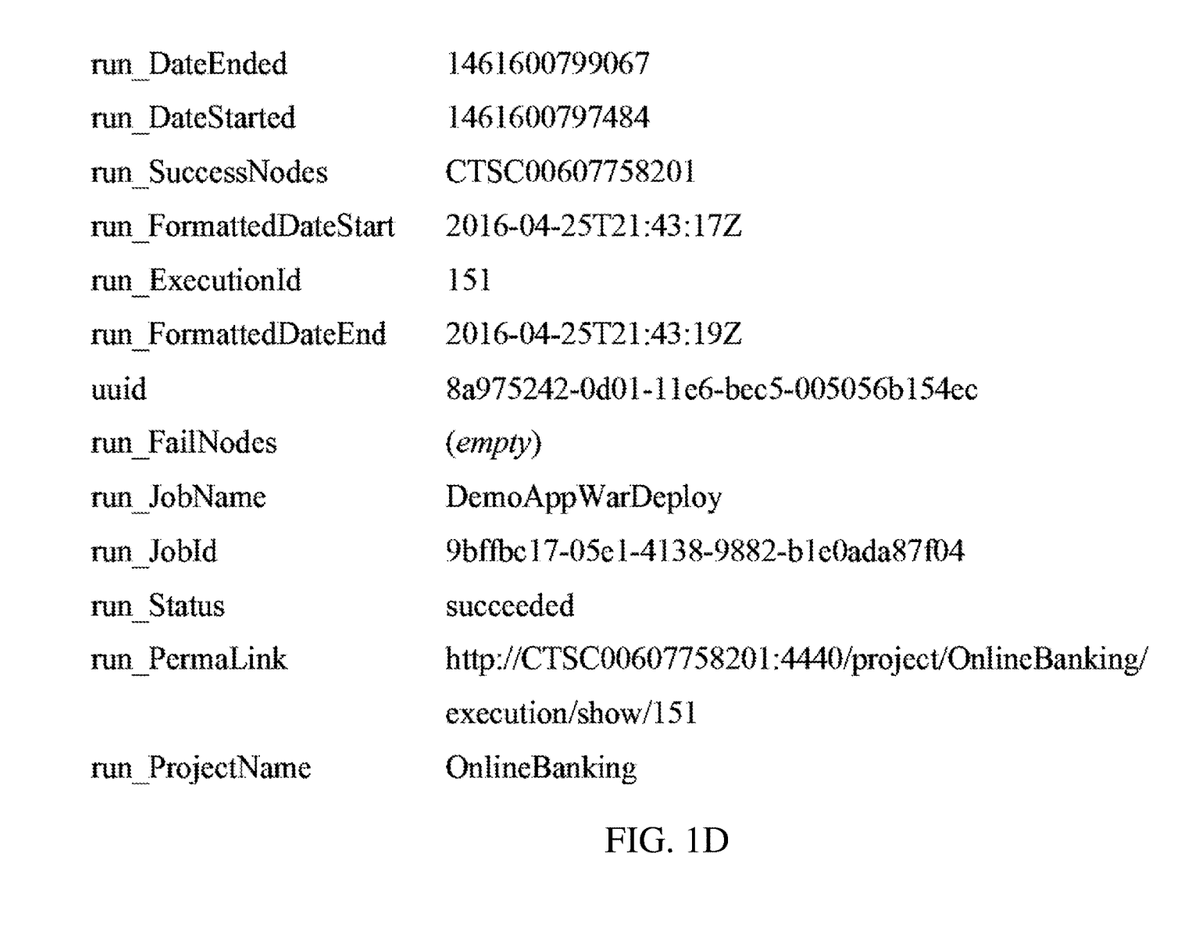
FIG. 1D is a table representing the data collected from the deployment automation tool RunDeck, in accordance with an exemplary embodiment of the present invention.

FIG. 1D is a table representing the data collected from the deployment automation tool RunDeck, in accordance with an exemplary embodiment of the present invention. The data in the table provides timestamp of deployment of build from Jenkins. Further, based on the time elapsed at each stage of the SDLC, the DevOps engine 108 is capable of calculating the total time elapsed from the code commit to deployment. The relationship of the data in the above mentioned tables with the data in the other tables enables in co-relating the data. From the above tables, the following exemplary relationships are identified:

GIT to Jenkins—Jenkins Triggered by GIT
Jenkins to Sonar—Sonar Trigger by Jenkins
RunDeck Deployment by Jenkins In an embodiment of the present invention, the DevOps engine 108 is capable of calculating the additional cost incurred in release by identifying areas of the SDLC that require attention, ensuring proper procedures and standards are followed during SDLC, estimating technical debt, monitoring the various phases of the SDLC, determining engineering metrics for the portfolio/application, determining the parts of SDLC that are broken, estimating effort and time required for build and deployment, estimating velocity of the application and estimating value of each release. In an embodiment of the present invention, the system 100 is capable of estimating cost of the software release by applying pre-stored costing algorithms. Estimating the cost of the software release facilitates in tapering down the costs of future software releases by automation, optimization and observing the past trends. In an embodiment of the present invention, the additional cost incurred during the release of the software is estimated by first defining various vectors and tools required in the SDLC. Further, the co-related data is then used to determine the time delay in moving from one phase of the SDLC to another phase. The total time delay in a particular SDLC is then determined to be the cumulative time delay during the entire SDLC. The total time delay is then associated with the pre-defined cost per hour to determine total costs incurred due to the total time delay in the SDLC.

In an embodiment of the present invention, the system 100 is capable of storing historical data pertaining to past SDLCs which is further processed to derive meaningful information. The derived information can be used to validate or invalidate hypothesis for future SDLCs.

Figure 2:
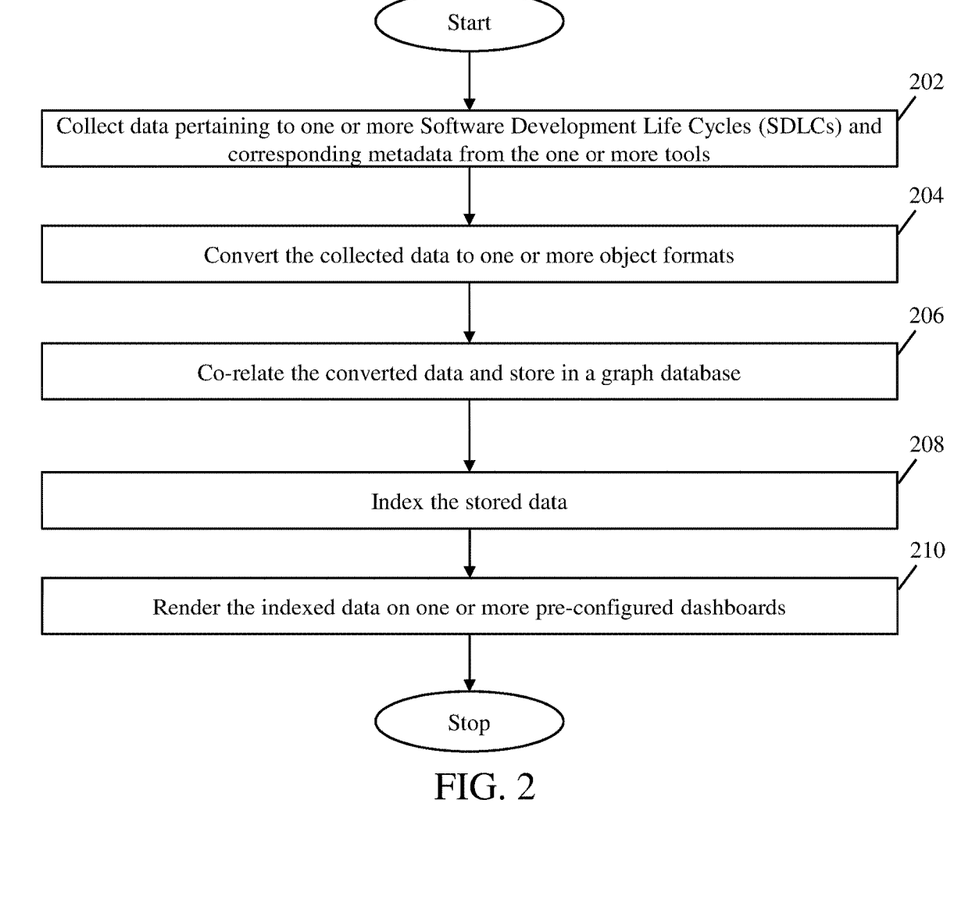
FIG. 2 is a flowchart illustrating a method for automatically and efficiently monitoring the one or more SDLCs, in accordance with an embodiment of the present invention.

FIG. 2 is a flowchart illustrating a method for automatically and efficiently monitoring the one or more SDLCs, in accordance with an embodiment of the present invention.

At step 202, data pertaining to one or more Software Development Life Cycles (SDLCs) and corresponding metadata is collected from the one or more tools. The one or more tools are employed by one or more enterprises for developing software products. Further, each tool has specific functionalities and interacts with other tools during Software Development Life Cycle (SDLC) of the software product. In an embodiment of the present invention, the one or more tools include, but not limited to, Source Control Management (SCM) tools, Continuous Integration (CI) tools, code review tools, static code analysis tools, release planning tools, artifact repositories, package repositories, Information Technology Service Management (ITSM) tools, deployment automation tools, infrastructure provisioning tools, database versioning tools, configuration automation tools and release monitoring tools. Further, each SDLC requires a specific set of tools for development of the software product. The data pertaining to the one or more SDLCs provided by the one or more tools include, but not limited to, details on how and when the tools were part of the one or more SDLCs. In an embodiment of the present invention, the data is collected from the one or more tools using Representational State Transfer (REST) Application Program Interface (API).

At step 204, the collected data is converted to one or more object formats. In an embodiment of the present invention, the collected data is converted into a JavaScript Object Notation (JSON) format. Further, the converted data in the JSON format is then used for creating and storing one or more nodes in a graph database.

At step 206, the converted data is correlated and stored in the graph database. In an embodiment of the present invention, the converted data is correlated in the form of the one or more nodes, one or more relationships and their corresponding properties. In an embodiment of the present invention, the converted data is stored in the graph database as the one or more nodes and the relationship between the one or more nodes are stored as relationship structure of the graph database. The relationships may be stored in uni-directional or bi-directional format. Once a particular node is found, using the relationships corresponding to the particular node, the entire chain of SDLC is built. In an embodiment of the present invention, the correlated data is further processed to generate meaningful insights and reports.

At step 208, the stored data in the graph database is indexed. In an embodiment of the present invention, specific sets of data stored in the graph database are selectively indexed. Further, indexing specific sets of data from the graph database facilitates in making the indexed data readily available for use to the one or more users. Furthermore, the indexed data is easily searchable and capable of providing meaningful insights to one or more users. In an exemplary embodiment of the present invention, the indexed data is searched using Elasticsearch for locating the one or more nodes.

At step 210, the indexed data is rendered on one or more pre-configured dashboards for the one or more users. In an embodiment of the present invention, the one or more users may customize the one or more pre-configured dashboards based on user preferences to view specific data related to the one or more SDLCs. In an embodiment of the present invention, the one or more pre-configured dashboards and one or more custom dashboards are rendered for the one or more users via one or more electronic devices.

In an embodiment of the present invention, data stored in the graph database and the indexed data is fetched and rendered on the one or more pre-configured dashboards and the one or more custom dashboards. Further, the fetched data is rendered on the one or more pre-configured dashboards based on pre-defined roles of the one or more users. In an embodiment of the present invention, the one or more electronic devices used by the one or more users include, but not limited to, laptops, desktops and handheld devices such as tablets and mobile phones.

In an embodiment of the present invention, the data stored in the graph database and the indexed data, pertaining to past SDLCs, is further processed to derive meaningful information. The derived information can be used to validate or invalidate hypothesis for future SDLCs.

In an embodiment of the present invention, the data stored in the graph database is used to calculate the additional cost incurred in release by identifying areas of the SDLC that require attention, ensure proper procedures and standards are followed during SDLC, estimate technical debt, monitor the various phases of the SDLC, determine engineering metrics for the portfolio/application, determine the parts of SDLC that are broken, estimate effort and time required for build and deployment, estimate velocity of the application and estimate value of each release. In an embodiment of the present invention, the cost of the software release is estimated by applying one or more pre-stored costing algorithms. Estimating the cost of the software release facilitates in tapering down the costs of future software releases by automation, optimization and observing the past trends. In an embodiment of the present invention, the additional cost incurred during the release of the software is estimated by first defining various vectors and tools required in the SDLC. Further, the co-related data is then used to determine the time delay in moving from one phase of the SDLC to another phase. The total time delay in a particular SDLC is then determined to be the cumulative time delay during the entire SDLC. The total time delay is then associated with the pre-defined cost per hour to determine total costs incurred due to the total time delay in the SDLC.

Figure 3:
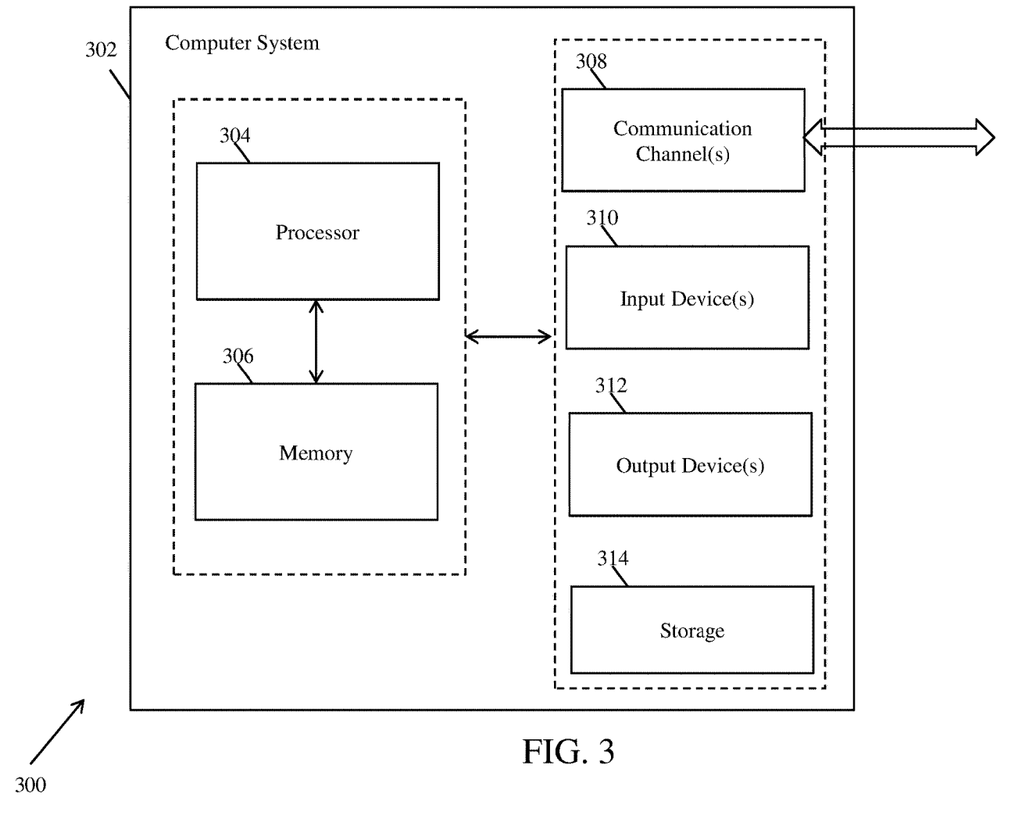
FIG. 3 illustrates an exemplary computer system for automatically and efficiently monitoring the one or more SDLCs, in accordance with an embodiment of the present invention.

FIG. 3 illustrates an exemplary computer system for automatically and efficiently monitoring the one or more SDLCs, in accordance with an embodiment of the present invention.

The computer system 302 comprises a processor 304 and a memory 306. The processor 304 executes program instructions and may be a real processor. The processor 304 may also be a virtual processor. The computer system 302 is not intended to suggest any limitation as to scope of use or functionality of described embodiments. For example, the computer system 302 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 310 may include, but not limited to, a keyboard, mouse, pen, joystick, trackball, a voice device, a scanning device, or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A computer system for monitoring one or more software development life cycles, the computer system interfacing with a plurality of tools for development of software, the computer system comprising a microprocessor communicatively coupled to a memory, the computer system comprising:
    one or more agents configured to:
        automatically collect, using the microprocessor, data pertaining to one or more Software Development Life Cycles (SDLCs) from the plurality of tools, the data comprising details of activity performed by the plurality of tools and time interval associated therewith, for which each tool of the plurality of tools is a part of the one or more SDLCs; and
        place the collected data in a messaging queue of a messaging bus for transmission to a data aggregator and co-relator;
    the data aggregator and co-relator configured to convert, using the microprocessor, the collected data to one or more object formats and establish co-relation between the converted data s and corresponding relationships and properties in the form of one or more nodes in a graph database, wherein each of the one or more nodes comprise converted data corresponding to a specific tool;
    an indexed database configured to index, using the microprocessor, the correlated data stored in the graph database for locating the one or more nodes; and
    a dashboard viewer configured to render, using the microprocessor, the indexed data on one or more pre-configured dashboards for one or more users.

2. The computer system of claim 1, wherein the one or more tools comprises Source Control Management (SCM) tools, Continuous Integration (CI) tools, code review tools, static code analysis tools, release planning tools, artifact repositories, package repositories, Information Technology Service Management (ITSM) tools, deployment automation tools, infrastructure provisioning tools, database versioning tools, configuration automation tools and release monitoring tools.

3. The computer system of claim 1, wherein the data is collected by the one or more agents using Representational State Transfer (REST) Application Program Interface (API).

4. The computer system of claim 1, wherein the one or more object formats comprise Java Script Object Notation (JSON) format.

5. The computer system of claim 1 further comprising a query builder, using the microprocessor, configured to provide options to facilitate the one or more users to create one or more customized dashboards, wherein the one or more customized dashboards are created by customizing the one or more pre-configured dashboards based on user preferences.

6. A computer-implemented method, performed by a system interfacing with a plurality of tools, for monitoring one or more software development life cycles of the tools, via program instructions stored in a memory and executed by a processor, the computer-implemented method comprising:
  automatically collecting data pertaining to one or more Software Development Life Cycles (SDLCs) from the plurality of tools, the data comprising details of activity performed by the plurality of tools and time interval associated therewith, for which each tool of the plurality of tools is a part of the one or more SDLCs;
  placing the collected data in a messaging queue of a messaging bus for onward transmission;
  converting the collected data to one or more object formats;
  co-relating the converted data and corresponding relationships and properties in the form of one or more nodes in a graph database, wherein each of the one or more nodes comprise converted data corresponding to a specific tool;
  indexing the correlated data for locating the one or more nodes; and
  rendering the indexed data on one or more pre-configured dashboards for one or more users.

7. The computer-implemented method of claim 6, wherein the one or more tools comprise Source Control Management (SCM) tools, Continuous Integration (CI) tools, code review tools, static code analysis tools, release planning tools, artifact repositories, package repositories, Information Technology Service Management (ITSM) tools, deployment automation tools, infrastructure provisioning tools, database versioning tools, configuration automation tools and release monitoring tools.

8. The computer-implemented method of claim 6, wherein the data is collected using Representational State Transfer (REST) Application Program Interface (API).

9. The computer-implemented method of claim 6, wherein the one or more object formats comprise Java Script Object Notation (JSON) format.

10. The computer-implemented method of claim 6 further comprising step of creating one or more customized dashboards, wherein the one or more customized dashboards are created by customizing the one or more pre-configured dashboards based on user preferences.

11. A computer program product for monitoring one or more software development life cycles, the computer program product comprising:
  a non-transitory computer-readable medium having computer-readable program code stored thereon, the computer-readable program code comprising instructions that when executed by a processor, cause the processor to:
  automatically collect data pertaining to one or more Software Development Life Cycles (SDLCs) from a plurality of tools, the data comprising details of activity performed by the plurality of tools and time interval associated therewith, for which each tool of the plurality of tools is a part of the one or more SDLCs;
  place the collected data in a messaging queue of a messaging bus for onward transmission;
  convert the collected data to one or more object formats;
  co-relate the converted data and corresponding relationships and properties in the form of one or more nodes in a graph database, wherein each of the one or more nodes comprise converted data corresponding to a specific tool;
  index the correlated data for locating the one or more nodes; and
  render the indexed data on one or more pre-configured dashboards for one or more users.

12. The computer program product of claim 11, wherein the one or more tools comprise Source Control Management (SCM) tools, Continuous Integration (CI) tools, code review tools, static code analysis tools, release planning tools, artifact repositories, package repositories, Information Technology Service Management (ITSM) tools, deployment automation tools, infrastructure provisioning tools, database versioning tools, configuration automation tools and release monitoring tools.

13. The computer program product of claim 11, wherein the data is collected using Representational State Transfer (REST) Application Program Interface (API).

14. The computer program product of claim 11, wherein the one or more object formats comprise Java Script Object Notation (JSON) format.

15. The computer program product of claim 11 further comprising creating one or more customized dashboards, wherein the one or more customized dashboards are created by customizing the one or more pre-configured dashboards based on user preferences.

* * * * *